United States Patent [19]

Bedard

[11] Patent Number: 5,625,446
[45] Date of Patent: Apr. 29, 1997

[54] OPTICAL MEASUREMENT SYSTEM FOR ARTICLES WITH VARYING SURFACE REFLECTIVITY

[75] Inventor: Kenneth J. Bedard, Hartford, Conn.

[73] Assignee: United Technologies Corporation, Hartford, Conn.

[21] Appl. No.: 138,737

[22] Filed: Oct. 18, 1993

[51] Int. Cl.$^6$ .............................. G01C 3/00; G01B 11/14; B24B 49/12

[52] U.S. Cl. ..................... 356/3.08; 356/4.01; 356/375; 451/6

[58] Field of Search ................... 356/1, 4, 375, 356/4.01, 3.03; 451/6

[56] References Cited

U.S. PATENT DOCUMENTS

| | | | |
|---|---|---|---|
| 3,679,307 | 7/1972 | Zoot et al. | 356/1 |
| 4,326,804 | 4/1982 | Mossey | 356/375 |
| 4,501,095 | 2/1985 | Drinkuth et al. | 51/165.72 |
| 4,512,115 | 4/1985 | Miller | 51/289 |
| 4,765,742 | 8/1988 | Davinson | 356/373 |
| 4,771,182 | 9/1988 | Fulkerson | 250/561 |

OTHER PUBLICATIONS

T. Higgins, "There is a lot more to an A–O modulator than meets the eye" Laser Focus World, Jul. 1991, pp. 133–142.
R. Goldstein "Electro–Optic Devices in Review" Lasers and Applications Apr. 1986.
Lasermetrics, Inc. "Technical/and Operation Manual for Transverse Field Electro–Optic Light Modulators" circa 1973.

Primary Examiner—Stephen C. Buczinski

[57] ABSTRACT

An electro-optical system for high speed measuring of the dimensions of a multiplicity of articles having varying part-to-part surface reflectivity comprises impinging a modulated intensity light beam on each individual article, where the intensity of the beam impinged on the article is varied in response to the image signal from a prior beam impingement. The intensities of image signals from all articles are made comparatively uniform, to improve accuracy. Preferably, light intensity is modulated for each individual article at a speed commensurate with less than 0.004 second pass-by intervals by phase shifting a polarized laser light beam using a Pockel Cell type electro-crystallographic device. The system is particularly useful in grinding the tips of blades of gas turbine engine rotors while the blades are mounted in a spinning rotor.

16 Claims, 5 Drawing Sheets

OPTICAL MEASUREMENT SYSTEM FOR ARTICLES WITH VARYING SURFACE REFLECTIVITY

TECHNICAL FIELD

The present invention relates to non-contact measuring systems, more particularly, to an optical system employing a laser light level control, especially adapted to high speed manufacturing and metalworking processes.

BACKGROUND

One problem which the invention solves is understood with respect to one close tolerance manufacturing application: The grinding to length of the tips of gas turbine engine blades mounted in a spinning rotor. The process is generally described in Miller U.S. Pat. No. 4,512,115. The blade tips pass very quickly by both the grinding wheel contact point and the measurement point; typical times of passing are of the order of 0.004 seconds. Thus, a very quick and accurate means of measuring is required.

As described in Drinkuth et al. U.S. Pat. No. 4,501,095, a method and apparatus for accomplishing the necessary measurement comprises a laser triangulation system. Laser light is read and measurements are made for each individual blade, which measurements were not possible previously, given the high speeds at which blades pass by. A control system guides the grinding apparatus accordingly, and a uniform and precise degree of metal removal is achieved.

In process of the Drinkuth et al. patent, the light intensity impinged on the blades is controlled by a motor driven cam type mechanical aperture that blocks part of laser light emitted from the source. The intensity control seeks to make the refelected light neither too high nor too low for the position sensor. If the reflected light intensity and resultant sensor signal level is too low, the signal to noise ratio will be low and there will be resultant measurement error. On the other hand, if the reflected light intensity is too large, then the sensor will become saturated, resulting in imprecise computation of signal centroid with concomitant measurement error.

The response rate of familiar mechanical aperture devices is low, at the order of 1 Hz, compared to the 250 blade/s and greater rate at which blade tips pass by the measuring point. Thus, heretofore, the aperture has been necessarily set to provide some average light intensity for blade grinding. Such system worked satisfactorily on new rotor systems.

However, with evolving blade technology and with re-manufacturing, it has been discovered that blade tips may now vary substantially from one to the next in their surface reflectance character, compared to the general uniformity which characterized the original context of manufacturing new products. For example, some blade tips are coated; and, for a mixture of old and new blades, some will be dull and others shiny.

When using an averaged laser light intensity, for such mixtures of blades there will be erroneous measurements, defeating important objects of the original inventions. When brighter blades influence the average intensity setting, very dull blades may not be sensed; and, an absence of signal can lead to inoperability of the system, or the necessity for guessing. Analagous imprecision will occur for bright blades when the average intensity is influenced by very dull blades, for reasons given above. A not unusual maximum-minimum variation in reflected intensity is of the order of 50:1, when using an average or comprise level of intensity. And, with such a limitation, the invention is limited in being applied for other high speed measuring applications.

Thus, there has been a need for a better means of measuring blades in the prior art grinding method; and, in other measuring systems which require the essential aims of rapid accurate measurements on parts which are only momentarily available for gaging.

SUMMARY

An object of the invention it to provide a means and process for making a non-contact gaging system more accurate, where the articles being measured vary in their reflecting of light. A more particular object of the invention is to provide an improved apparatus for grinding and measuring blade tip lengths, when blades are mounted in a gas turbine rotor for machining and rapidly passing by the point of measurement.

In accord with the invention, the method for position or dimension measuring is improved, especially for articles having varying part-to-part surface character, by modulating the intensity of light impinged on each article, according to a prior image signal indicative of the intensity of light previously reflected from the article, so that with repetitive impingements, the intensity of impinged light beam is varied from article to article, and the intensity of reflected light is made substantially uniform compared to the variation which obtains in the prior art method. In the preferred mode, the multiplicity of articles is presented sequentially and repetitively, and the ratio between maximum and minimum image signal intensity is made less than 5 to 1, most preferably in the range of 1.3 to 1.

In further accord with the invention, a device for rapidly and accurately measuring the dimension of each article in a multiplicity of articles having variations in individual article surface reflectivity is comprised of a light source producing a light beam; means for individually impinging the beam on each article as it is presented at the measuring point; means for providing an image signal indicative of both the relative position of the article and the intensity of light beam reflected from the article; means for computing the dimension of each article from the article's image signal; and, means for individually modulating the intensity of the light beam impinged on each article, responsive to the image signal; to make substantially uniform the intensities of reflected light beam for all articles.

Preferably, the invention is comprised of a laser source that provides a polarized light beam; the beam is passed through an intensity modulator comprised of an optical phase shifter, most preferably a so-called Pockel Cell; and, the beam is then passed through an analyzer, the polarization axis of which is perpendicularly crossed with the polarization axis of the source beam, to provide a modulated beam intensity. Such apparatus has a particularly high rate of response, and thus the beam intensity can be varied for each article as it passes by the measuring point.

In the preferred embodiments, the invention is suited for rotor machining where blade parts have measuring point pass-by rates greater than 250 parts/s; more preferably, 1500 parts/s; corresponding to blade-to-blade interval times of 0.004–0.0007 seconds or less. The invention is capable of measuring parts having pass-by rates of 15 kHz, where interval times are less than 0.00007 seconds. As a result, the measuring and machining of blades is made more accurate. Analogous benefits will be realized in other situations where high speed comparative measurements are needed for a series of articles.

The foregoing and other objects, features and advantages of the invention will become more apparent from the following description of the best mode of the invention and accompanying drawings.

DESCRIPTION

The invention is described with respect to a particular manufacturing process wherein turbine blade tips are ground. The particular apparatus and method are improvements on those described in Miller U.S. Pat. No. 4,512,115 and Drinkuth et al. U.S. Pat. No. 4,501,095, having common assignee herewith, the disclosures of which are hereby incorporated by reference. The invention has more general application as well, to the measuring of a series of parts in any process.

Figure 1:
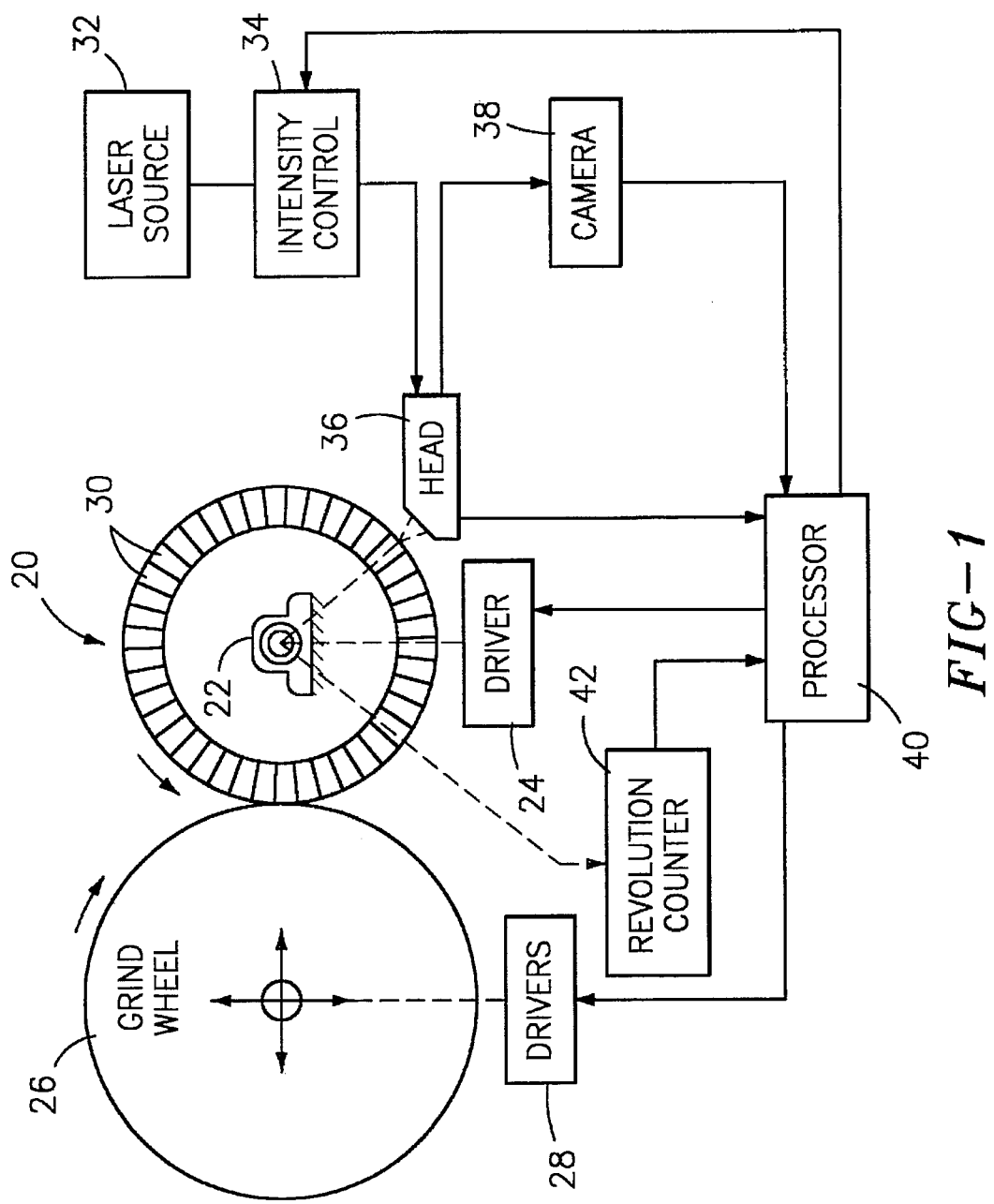
FIG. 1 is a schematic of the measuring system of the invention as applied to the grinding of a gas turbine rotor.

The apparatus is shown schematically in FIG. 1. The bladed rotor 20 is rotated about mounting bearing 22 by a driver 24. Rotating grinding wheel 26 translates vertically and laterally relative to the rotor by means of drivers 28, to remove material from outer tips of the blades 30.

The essential blade tip length measuring system is comprised of a laser light source 32 and laser light intensity control unit 34 which provides a light beam to the head 36 mounted proximate the spinning blade tips at the measuring point. The reflected light beam is received at the head and sensed by the camera 38. Magnetic pickup revolution counter 42 signals the rotation of the rotor and the angular position of any particular blade relative to a circumferential datum, to enable identification of the particular blade being measured. Units are interconnected with processor 40.

The light source is a Model 05LHP151 five mw helium neon laser (Melles Griot Co., Irvine, Calif., USA). The source has an integral polarizer. Sources without integral polarizers can be used, of course, with the beam being passed through a polarizer which is upstream of, or integrated in, the intensity control.

The camera is a Model 1902 CCD line scan camera (EG&G Recticon Co., Salem, Mass., USA). The camera has an array of 512 photo diodes and charge coupling device technology to sense beam position and intensity.

Laser light intensity controller 34 includes a so-called Pockel Cell. A Pockel Cell is an electro-optical modulator device comprising a uniaxial potassium dideuterium phosphate crystal which, under stress of an electric field, modulates the phase of light passing through, shifting it linearly and circumferentially. The effect is similar to that obtained with ¼ and ½ wave optical retardation plates. Preferably, the Pockel cell is in a Model LMA-1 Transverse Field Modulator (Lasermetrics, Inc. Englewood, N.J., USA); it is sometimes referred to as a "TFM". The general principles of operation and use of the TFM and Pockel Cells in general will be understood by reference to Technical Memo 7011, published by Lasermetrics, Inc. See also the article by R. Goldstein, "Electro-Optic Devices in Review", in the journal Lasers and Applications, April 1986. The foregoing publications are hereby incorporated by reference.

Figure 2:
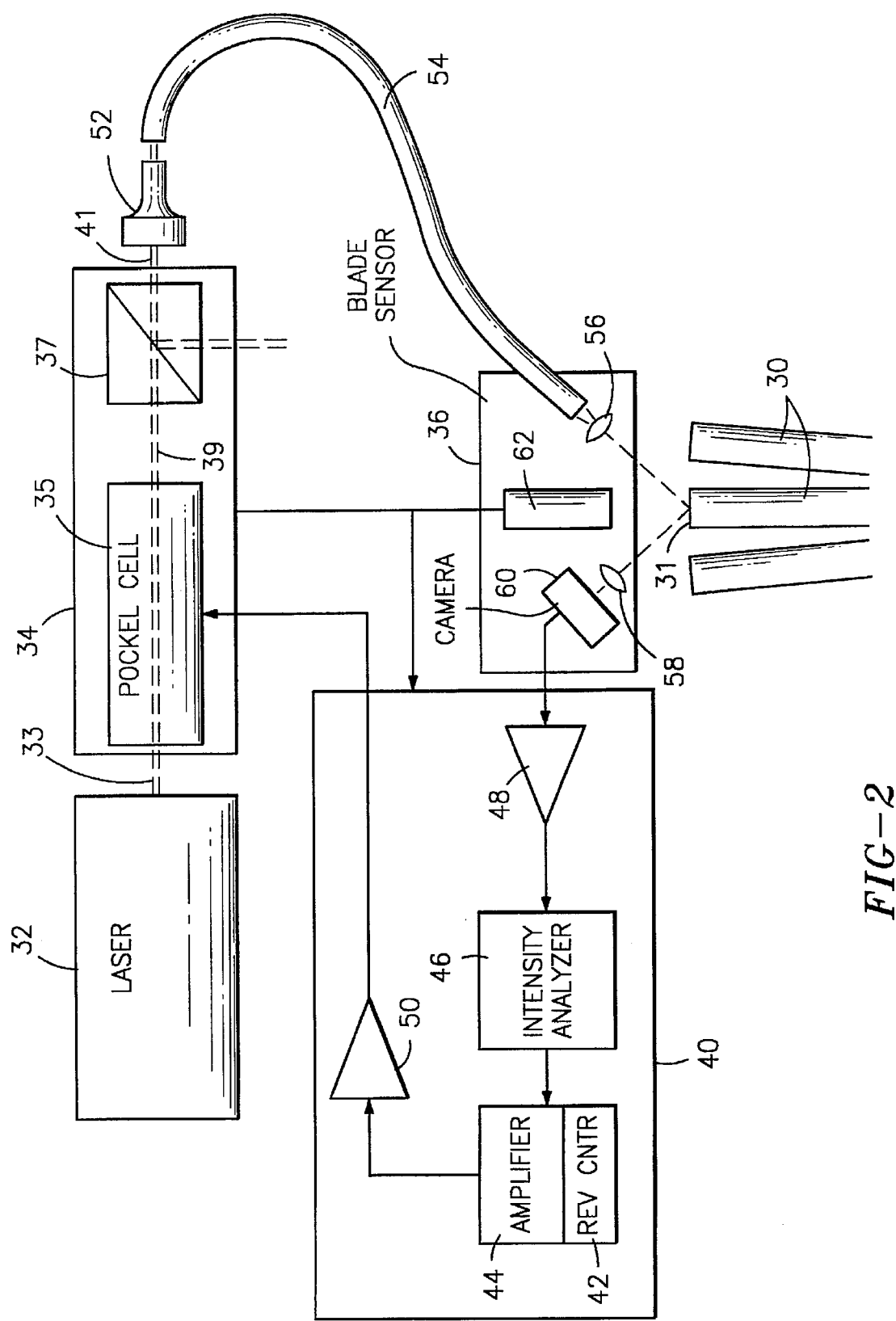
FIG. 2 is a more detailed schematic of parts of the system of FIG. 1.

FIG. 2 illustrates in more detail certain parts of the invention. The helium neon laser source 32 produces a linearly polarized output beam 33 which is delivered to the Pockel cell part 35 of the intensity controller 34. The polarization direction of the beam delivered to the cell is parallel to the input polarization vector marked on the TFM housing.

The beam 39 exiting the Pockel cell is delivered to polarized light analyzer 37. The analyzer 37 may be Nicol or Wollaston prism; preferably it is a Glan-Thompson prism comprised of calcite. Its direction of polarization is perpendicular to the polarization vector of the light entering the cell. Thus, in the absence of any Pockel cell modulation, the polarized beam will not pass through the analyzer and out of the intensity controller.

When electric power (voltage) is applied to the Pockel cell, the polarization of the beam is phase shifted, and will pass through the analyzer to an extent depending on the amount of applied power. The intensity-modulated light beam 41 exits the intensity controller, goes through focus lens 52, into and through the fiber optic cable 54, to the head 36, where the light is guided by focus lens 56 onto the tip 31 of a blade 30. A portion of the light is reflected by the blade tip and passes through focus lens 58 into camera 60. The camera provides a position and intensity signal—referred to hereinafter as the "image signal"—to processor 40, with appropriate conversion from analog to digital form by electrical unit means 48. The image signal is processed in an intensity analyzer subcomponent 46 and in other familiar but unshown components of the processor which carry out the steps described herein.

The position indicated by the camera signal is a function of where the reflected beam falls within the camera array, which in turn is dependent on how far the blade tip is from the head. The intensity indicated by the signal is a function of the amount of light received within the camera which in turn is dependent on both the amount of light in the impinged beam and the reflectivity of the surface of the blade tip. By intensity of an image signal, as referred to herein, is meant the image signal intensity level indicated by the typical peak, P, of the signal curve shown in FIG. 4, and discussed further below.

In the preferred mode, the laser source supplies a constant strength beam, and the intensity of beam falling on a blade varies according to the degree of electric field activation of the Pockel cell. The electric field, or voltage, is provided, following appropriate digital-analog signal conversion by element 50 of the signal from amplifier 44 which in turn is fed by power supply 42.

Information dependent on the intensity of the image signal for any particular blade for any given pass is stored in the processor, and is used to provide a modulation signal to the controller 34, whereby the impinged beam optical character is altered when such particular blade is subsequently presented at the measuring point. Thus, a new value of light intensity will be impinged on a particular blade in a subsequent pass, such new value chosen to produce a desired image signal intensity level, greater or lesser as the case may be, which is more nearly at the desired level, until such desired level is obtained for the particular blade. This process is applied to all blades in the series, so the impinged beam intensity varies from blade to blade as needed, and so the image signals are made more uniform than obtained with a constant impinged light beam intensity.

A capacitative probe blade sensor 62, adjacent the focus lens, signals the presence of a blade at the measuring point. It replaces a silicon photo diode light beam detector in the prior invention. The blade sensor signal is used in the processor to time when the intensity controller (Pockel cell) is provided a voltage signal for a particular blade. It will be evident that other substitutional means may be used for timing.

Figure 3:
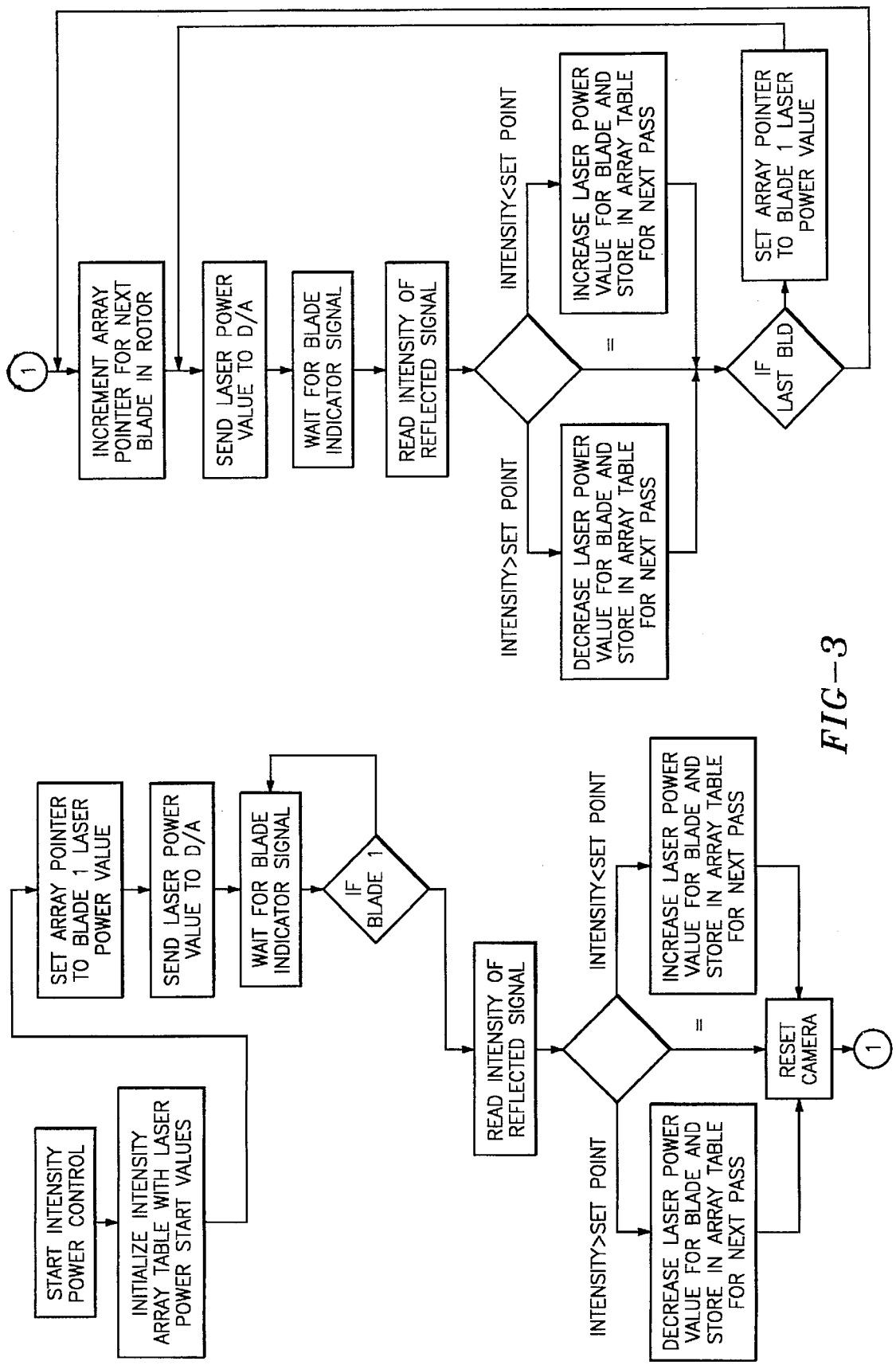
FIG. 3 is a flow chart for software used in operation of the invention.

FIG. 3 is a flow chart for the software by which the intensity of the impinged beam is achieved, according to the reflectivity of each particular blade. For the first pass, impinged intensity for each individual blade is set at an arbitrary selected value. As the FIG. 3 chart indicates, with subsequent passes by the measuring point any particular blade is subjected to an intensity—varied up or down—more nearly at, or equal to, the desired level. In this way, the desired intensity of reflected light from each of the blade tips is obtained.

The image signal from the camera provides position information. In the processor, the position of the centroid of the reflected signal with respect to the linear array of the camera is computed, to provide information on the length of the blade tip relative to the head. The position data is stored, to be confirmed or updated in subsequent passes, and to provide actuation signals to the grinding drivers according to the desired length of finishing.

Figure 4:
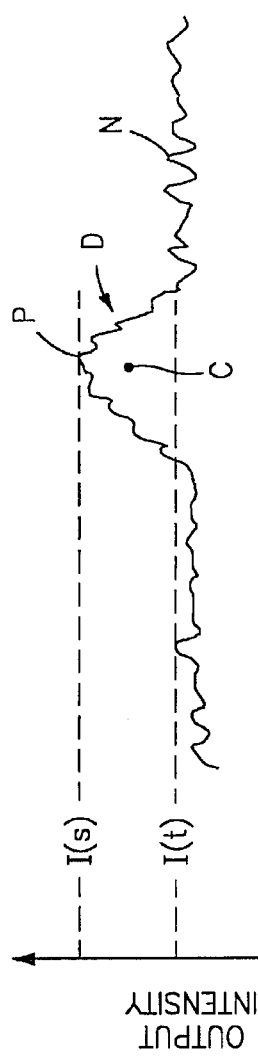
FIG. 4 shows the camera output intensity and postition signal indicative of a reflected light beam having a good level of intensity relative to both noise level and saturation level.
Figure 5:
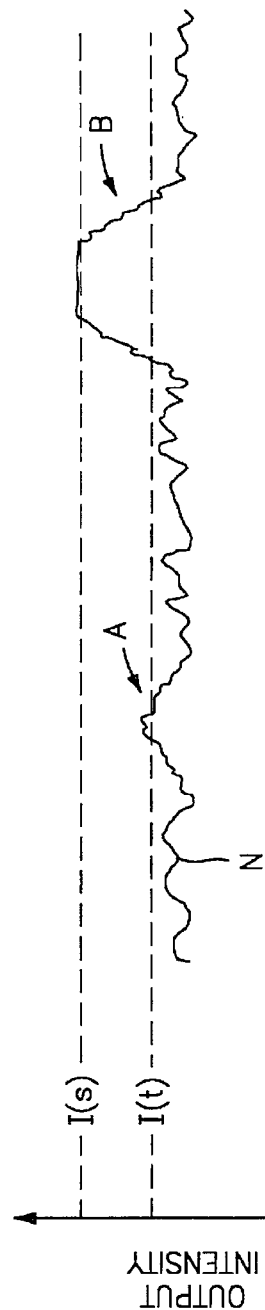
FIG. 5 is like FIG. 4, showing the output signals from a camera measuring articles having low and high reflectivity, where the impinged beam intensity is constant.

FIG. 4 and 5 illustrate both the problem with the prior art device and the function and solution of the invention. Since blade length is computed from the location of the centroid of image signal which is indicative of the reflected light beam, measurement accuracy is dependent on the quality of the signal. When the reflection is strong, but insufficient to saturate the camera sensor array, the camera provides a desired kind of image signal, D, reflective of blade position and reflected light intensity, as qualitatively illustrated by the graph of FIG. 4. The reflected intensity is less than that level I(s) which saturates diodes of the camera; preferably the peak P of the image signal is about 80 percent of I(s). The location of centroid C of reflected light intensity for an individual part (and thus the position or length of the blade tip of the part) is determined by calculation from the area under the part of the image signal curve D which is above the threshold level I(t). Level I(t) is set based on experience, to be above the noise level N.

If, as in the prior art, there is constant intensity of illumination for each blade at some average level, blades with inferior reflectivity will produce an image signal like curve A in FIG. 5. The magnitude of signal A will be insufficiently discernible from the background noise N for good computation (i.e., measurement); it may even be below the threshold level I(t), and the false absence of a blade would be indicated. As a corollary, blades having high reflectivity will produce a large magnitude of image signal, like curve B in FIG. 5, where the flat top of the curve indicates sensor saturation. Such occurs especially when the beam intensity has been raised to a relatively high average level to compensate for low reflectivity individual blades or to compensate for system speed (i.e., short duration of read time). When the sensor is saturated, calculation of the centroid and resultant length measurement become imprecise, owing to the chopping off of the peak signal.

Thus, when varying signals like those in FIG. 5 are received there will be errors in measurement, even to the point of no measurement. With the prior art grinding method and mechanical aperture beam modulation, the situation just described obtains. Typical pass-by rates are 250–1500 part/s (blade interval times of 0.004–0.0007 seconds), whereas the maximum reset rate of aperture is less than the order of 1 Hz. When there is part to part variation in surface reflectivity, operation of the whole system to the necessary degree of precision is unreliable.

When the invention described herein is used, the beam intensity impinged on low reflectivity blade tips is boosted, while the intensity impinged on high reflectively blade tips is decreased. The impinged intensity level for each blade is set at a level which provides, optimally, for each blade a nearly ideal image signal having a level like that described in connection with FIG. 4.

Figure 6:
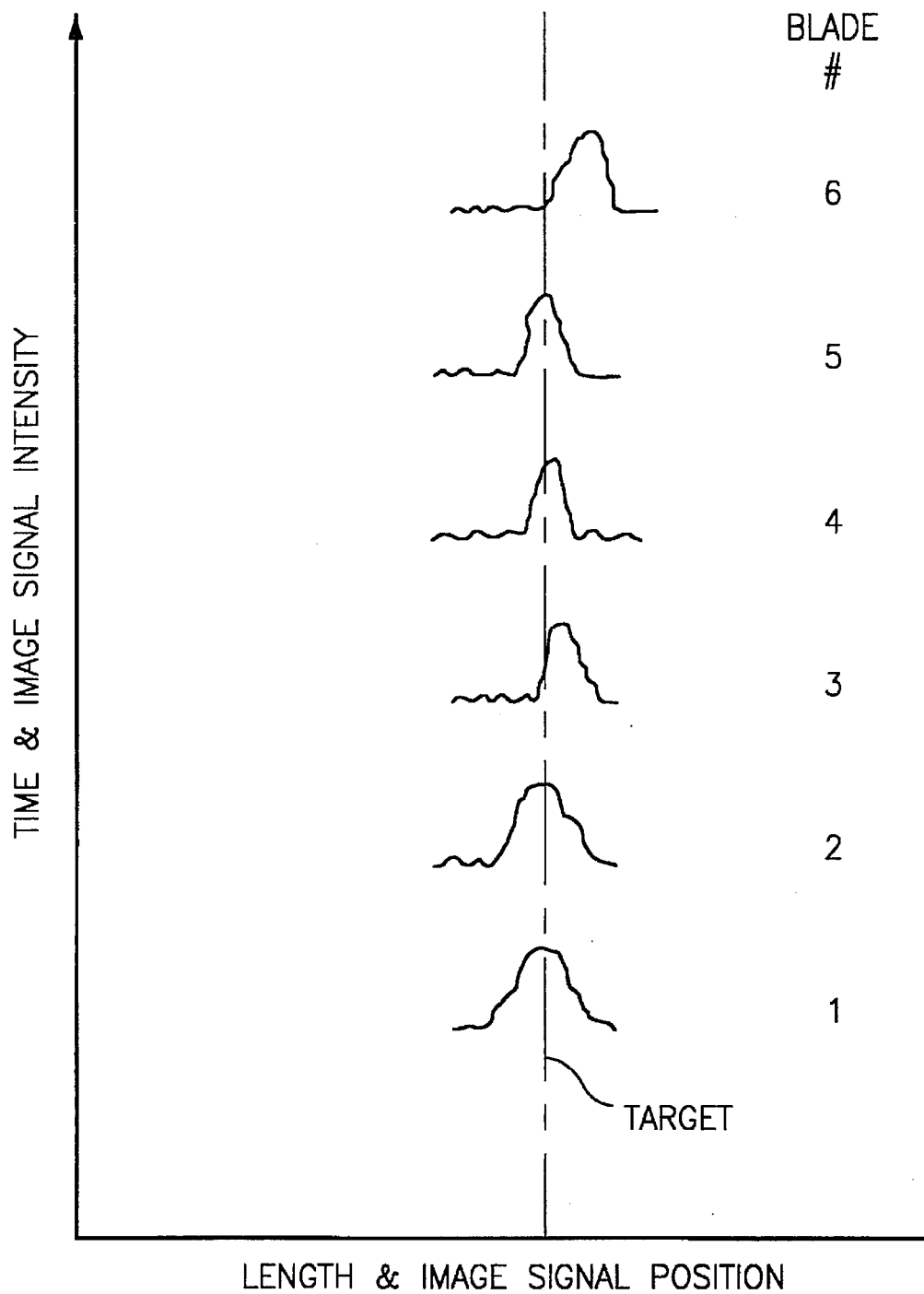
FIG. 6 is like FIG. 4, showing the signals from multiplicity of articles, where the impinged light beam has been modulated according to the variation in reflectivity of each articles, to make intensity of the signals substantially uniform.

FIG. 6 illustrates the kind of substantially uniform intensity signal pattern which results in practice of the invention. Even though blade tip character varies, the received signals are very similar in character, and the centroids of the signals will quite accurately be indicative of the blade tip lengths. Without the invention, when intensity is set at some average level, the above-threshold level image signal can vary substantially; the ratio of maximum (saturation) signal to minimum signal can readily be greater than 50 to 1, and can be infinity—as when low reflectivity blades produce signals below the noise threshold, I(t). With the invention, substantial uniformity is obtained in the context of the just mentioned prior art variation. For the preferred method and apparatus as applied to blade grinding, the ratio of maximum signal to minimum signal will typically be 1.3 to 1, and at least 5 to 1 or less.

In the preferred mode, as reflected in the FIG. 3 flow chart, there is generated a first set of data based on image signals, as the blades pass by the measuring point in sequence. When the set of blades next passes by the measuring point, the information from the first set of image signals is used to vary the intensity of impinged beam, and thereby generate a second set of data resulting from the image signals. Other intensity level converging approaches may be embodied in software in the practice of the essential invention. For instance, for the image signal for each particular blade, the impinged beam intensity (e.g., due to Pockel cell modulation) in the next pass-by may be set to a level found in a look-up table, where the look-up table is comprised of empirical values.

The measuring rate for the system described above is about 15 kHz. Thus, it will be evident that the process described above may be modified, so that when parts are moving slowly compared to the measuring rate, the intensity may be measured and reset several times while an article is still in the measuring zone, to attain the desired uniform level in a single pass-by of each particular part.

In the preferred mode where the pass-by speed of the parts is fast even relative to the high speed capability of the system, as with the blade grinding, the parts are presented repetitively at the measuring point, in the same sequence. It will be evident that, in other applications and embodiments, the parts can be presented repetitively without being in the same sequence, in combination with a means for identifying which individual part is being presented.

Other kinds of laser light sources than the preferred laser described above may be used in the practice of the invention involving a Pockel type cell, provided the beam delivered to the Pockel cell is polarized and the beam power is within the capability of the cell. An unpolarized laser source may be used when a polarizer is incorporated into the intensity modulator.

Other optical devices may be used to modulate the output of the laser light source in the practice of the invention. For example, an unpolarized light beam may be passed through an acusto-optic (A-O) modulator, some versions of which are called a Bragg Cell. See the article by T. Higgins "There is a Lot More to an A-O Modulator Than Meets the Eye" in Laser Focus World, July 1991, page 133–143, which is hereby incorporated by reference. In A-O modulators an acoustic drive signal causes angle/intensity change of the light beam passing through a crystallographic material. Bragg type cells are less preferred because they do not provide as smooth and precise intensity control as do Pockel cells. A so-called Kerr cell is another variant related to Bragg cells, and it may be used, though it has the disadvantage of requiring high input voltages.

A solid state laser may be employed instead of the preferred light source; the beam intensity is variable in such without the use of the separate intensity controller. However, because the current state of the art only provides limited life in such devices and because lasers with outputs outside the visible range are not readily available with desired low powers, such types of lasers are unpreferred presently.

The system just described will be applicable to measuring other articles than those mounted in a rotor. For instance, articles translating under the head may be measured; as may articles which are in other ways repetitively presented in any steady or variable order, provided the processor is provided with a signal indicating which particular article is being remeasured. And, of course, the parts may be static and the measuring system moved relative to them.

Although only the preferred embodiment has been described with some alternatives, it will be understood that further changes in form and detail may be made without departing from the spirit and scope of the claimed invention.

I claim:

1. A device for measuring the dimensions of a multiplicity of articles having varying individual article surface reflectivity comprising:

a light source, for providing a light beam;

means for repetitively and individually impinging the light beam at a point of measurement onto each article of the multiplicity, so the light beam is reflected from the surface of each article in a direction which varies according to the distance of the surface from the light source;

means for serially generating an image signal for each article of the multiplicity, indicative of the position and intensity of the light beam reflected from the surface of each article each time the light beam is impinged on the article; the means generating a first image signal for each article at the first time said light beam is impinged on each article at the point of measurement;

means for comparing the intensity of said first image signal for each article to a desired image signal intensity level having a selected favorable signal to noise ratio and total intensity ratio, and for generating and storing a light beam intensity modulation signal; and, means, responsive to said stored light beam intensity modulation signal, for modulating the intensity of the beam from the light source the second time the beam is individually impinged on each article, so that compared to said first image signal for each article, the second image signal for the same article which is generated is made more nearly at said desired image signal intensity level to thereby make more uniform the intensities of reflected light beam for all the articles.

2. The device of claim 1 comprising:

a light source generating a beam of light polarized along a first axis; and, means for modulating the intensity of the light beam comprising an optical phase shifter, positioned along the beam path prior to the beam's impingement on the article, for shifting the polarization of the beam; and, a polarized light analyzer, the axis of polarization thereof oriented perpendicularly to said first axis, the analyzer positioned between the optical phase shifter and the point of measurement; wherein the combination of means is adapted to measure articles at the point of measurement with an interval time of less than 0.004 seconds.

3. The device of claim 2 wherein the optical phase shifter comprises a uniaxial crystal responsive to an electric field dependent on the intensity of the image signal.

4. The device of claim 3 characterized by a Pockel Cell type optical phase shifter.

5. The device of claim 1 comprising an acusto-optical means for modulating the intensity of the beam, positioned along the beam path between the light source and the point of measurement.

6. The device of claim 1 characterized by a solid state light source having an integral means for modulating the intensity.

7. The apparatus of claim 2 wherein the means for modulating the intensity of the light beam provides different impinged light beam intensities for different articles, so that the ratio between the maximum and minimum intensity of reflected light from the articles as indicated by the image signals is less than about than 5 to 1.

8. The apparatus of claim 7 wherein said ratio is less than about 1.3 to 1.

9. The device of claim 1 wherein the means for modulating makes the reflected beam intensities, as indicated by the image signals, uniform at a level less than the level which saturates said means for serially generating an image signal.

10. The device of claim 9 wherein the means for providing an image signal is a camera having a linear diode array.

11. The method of measuring the dimension of a multiplicity of articles having varying individual article surface character, comprising the following steps for each particular article of the multiplicity:

impinging a light beam on the article surface at a measurement point at a first time;

generating a first image signal dependent on the intensity and position of the light beam reflected from the article surface at said first time;

comparing the intensity of the first image signal to a desired image signal intensity level having a selected favorable signal to noise ratio and total intensity level;

impinging the light beam on the article surface at a second time, the intensity of second time beam impinging chosen as a result of said comparing, to generate a second image signal more nearly at said selected favorable image signal intensity level.

12. The method of claim 11 characterized by impinging the light beam to generate a set of first image signals for the multiplicity of articles in a first sequence; storing information dependent on the the set of first image signals; and, impinging the light beam a second time on the multiplicity of articles in the series in a second sequence which is the same as said first sequence, to generate a set of second image signals.

13. The method of claim 12 characterized by presenting the articles at the point of measurement with an interval time of less than 0.004 seconds.

14. The method of claim 11 chararacterized by repeating the steps as necessary to make the image signals from individual parts substantially uniform, so that the ratio of maximum intensity to minimum intensity indicated by the image signal is less than about 5 to 1.

15. In the machining of the tips of blades in a rotating rotor assembly with removable spaced apart individual blades, of the type using an optical means for measuring the radial position of the tips of the blades relative to the rotational axis of the rotor during machining; wherein said means for measuring comprises impinging a light beam on the tip of each blade as each tip repetitively passes by a point of measurement, wherein the beam is reflected in a direction which varies according to the radial position of the tip, and individually generating for each blade an image signal indicative of the intensity of the reflected light beam and the radial position of the reflected light beam; wherein the extent of machining is dependent on the radial position of the tip indicated by the image signal; and, wherein the blade tips serially pass by a measuring point with a interval time of less than about 0.004 seconds; the improvement which comprises:

impinging a light beam on the tip of a blade at the measuring point at a first time;

generating a first image signal dependent on the intensity and position of the light beam reflected from the tip of said blade at said first time;

comparing the intensity of the first image signal to a desired image signal intensity level having a selected favorable signal to noise ratio and total intensity level;

modulating the intensity of the light beam at the second time the beam is individually impinged on a the tip of said blade, when the blade tip is passing by the point of measurement the second time, so that compared to said first image signal the second image signal which is generated is more nearly at said desired image signal intensity level; and, repeating the steps for all the blades in the rotor, to thereby make more uniform the intensities of reflected light beam for all the blades in the rotor, while machining the tips of the blades to make the radial positions of them substantially uniform.

16. The method of claim 15 wherein the improvement further comprises:

generating a light beam with a first axis of polarization;

shifting the phase of the light beam impinged on each particular blade tip, the degree of shifting responsive to the image signal, indicative of the intensity of the light reflected from each individual blade tip; and, transmitting the phase-shifted light beam through a polarized light analyzer, to modulate the intensity of the light beam impinged on the tip of each blade.

\* \* \* \* \*